United States Patent [19]
Gallignani

[11] Patent Number: 6,145,610
[45] Date of Patent: Nov. 14, 2000

[54] APPARATUS FOR LOCKING THE MOVABLE PARTS OF A VARIABLE GAUGE

[75] Inventor: Luigi Gallignani, Imola, Italy

[73] Assignee: Caterpillar Inc., Peoria, Ill.

[21] Appl. No.: 09/125,553

[22] PCT Filed: Feb. 28, 1997

[86] PCT No.: PCT/US97/03127

§ 371 Date: Aug. 27, 1998

§ 102(e) Date: Aug. 27, 1998

[87] PCT Pub. No.: WO97/31813

PCT Pub. Date: Sep. 4, 1997

[30] Foreign Application Priority Data

Feb. 29, 1996 [IT] Italy ................................ BO96A0095

[51] Int. Cl.[7] ................................................ B62D 55/10
[52] U.S. Cl. .......................................... 180/9.48; 180/906
[58] Field of Search .................... 180/9.1, 9.48, 180/41, 906; 280/42

[56] References Cited

U.S. PATENT DOCUMENTS

| | | | |
|---|---|---|---|
| 3,205,961 | 9/1965 | Nolte | 180/9.48 |
| 3,313,368 | 4/1967 | Carter et al. | 180/9.2 |
| 3,820,616 | 6/1974 | Juergens | 180/9.48 |
| 3,894,598 | 7/1975 | Yeou | 180/9.48 |
| 4,431,074 | 2/1984 | Langerud | 180/9.48 |
| 5,598,896 | 2/1997 | Haest | 180/9.48 |
| 5,901,800 | 5/1999 | Wilson et al. | 180/9.48 |

FOREIGN PATENT DOCUMENTS 1352032  5/1974  United Kingdom .......... B62D 55/10

*Primary Examiner*—Kevin Hurley
*Attorney, Agent, or Firm*—William C. Perry; John W. Morrison

[57] ABSTRACT

For machinery it is often desirable to change the gauge of the track or wheels. Variation of gauge is commonly accomplished by hydraulic cylinders which act through telescopic cross beams (3) to, for example, move tracks (2) of the machinery apart. Apparatus is disclosed to guide movement of the structure to change gauge and to lock the structure in place to prevent relative movement while the machinery is operated. Remote control (30) may be used to control these operations.

4 Claims, 5 Drawing Sheets

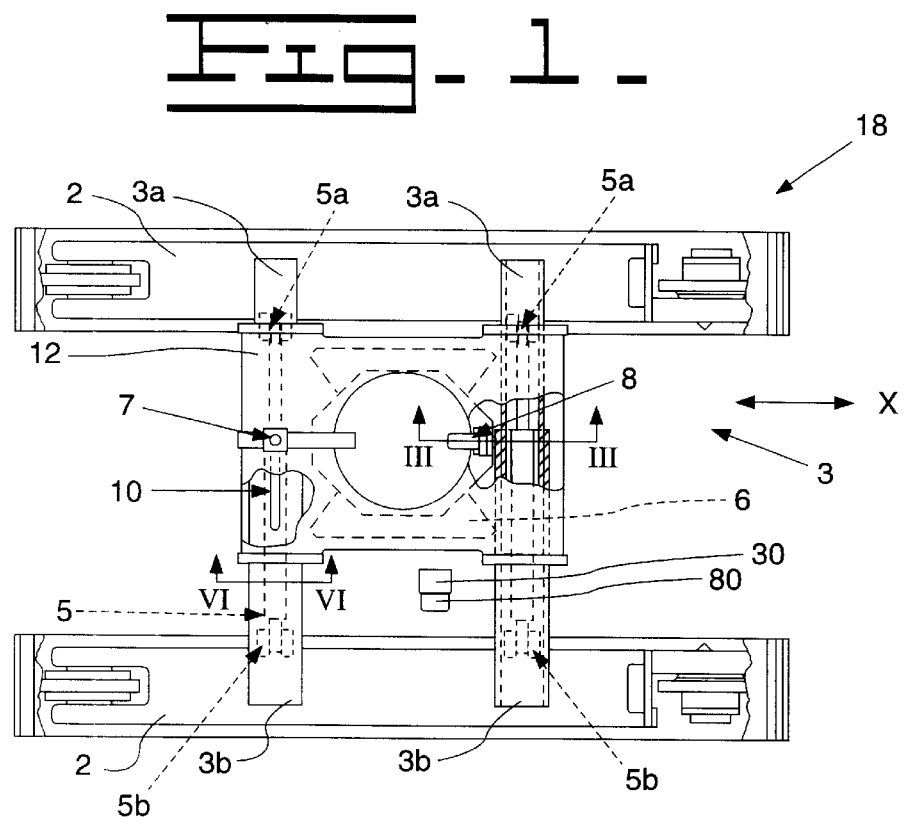
Fig_1_
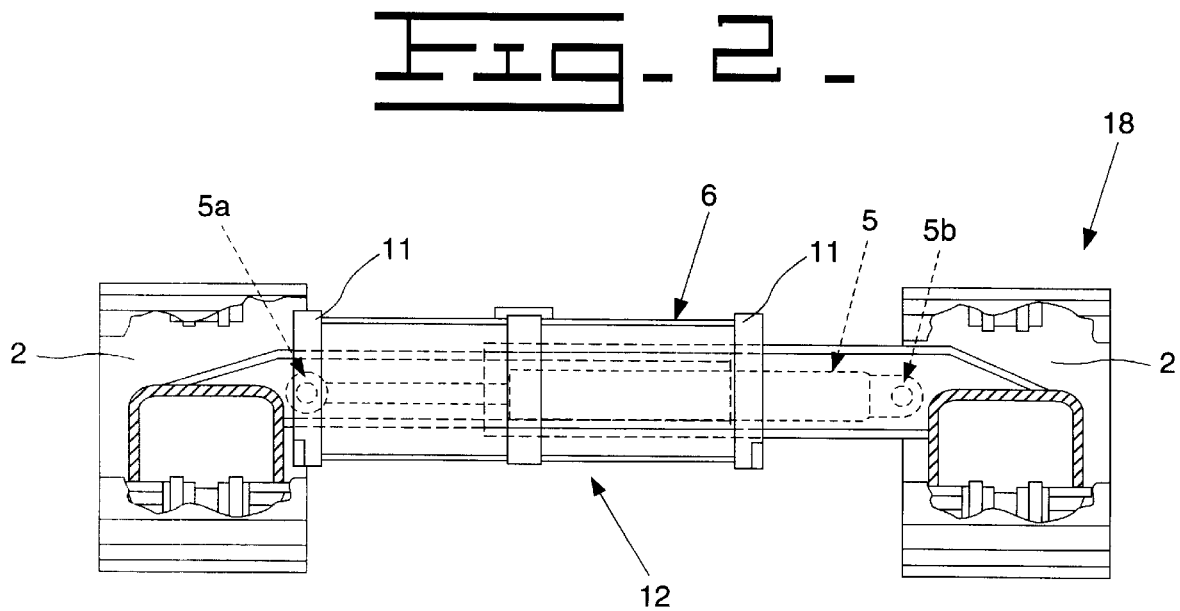
Fig_2_

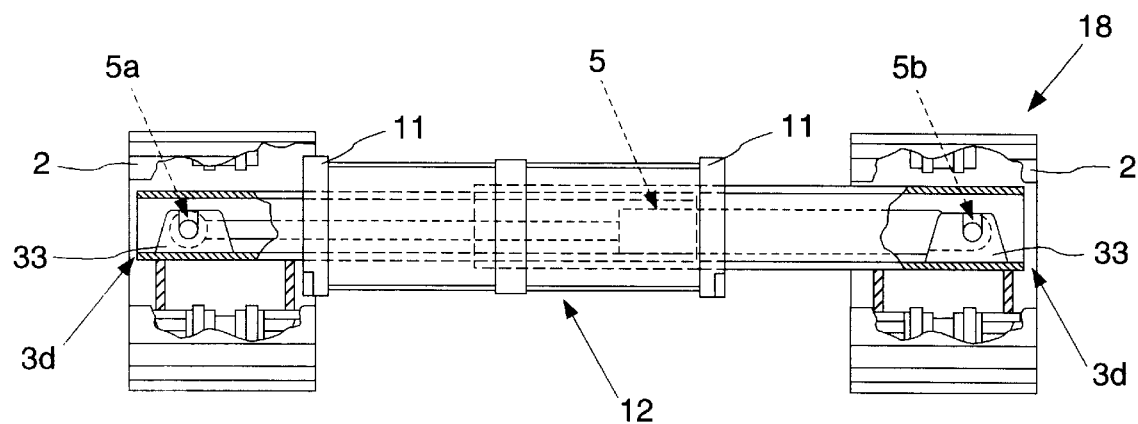
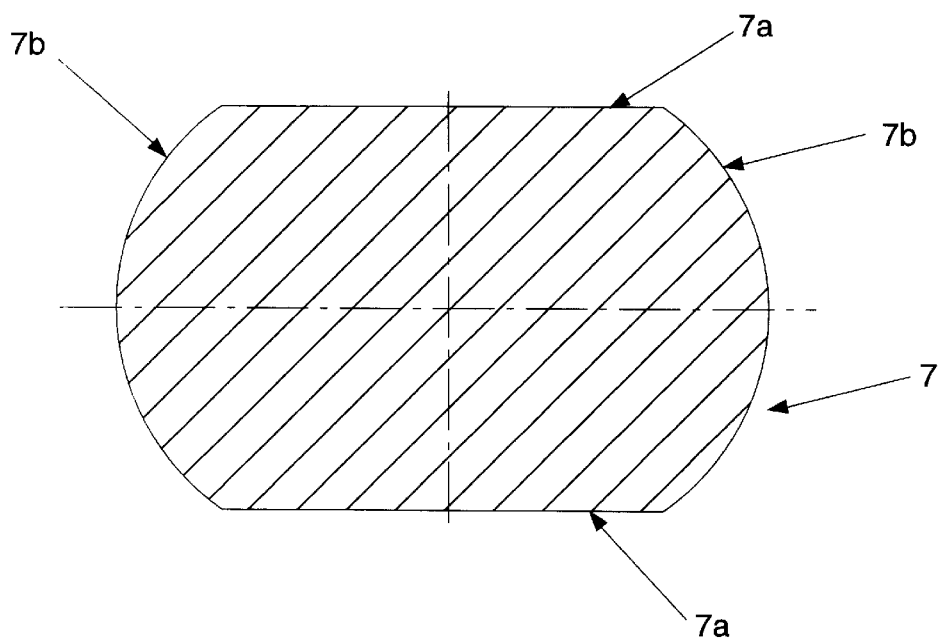

10

APPARATUS FOR LOCKING THE MOVABLE PARTS OF A VARIABLE GAUGE

TECHNICAL FIELD

The present invention relates to apparatus for locking together the movable parts of a structure provided for varying the gauge of variable gauge track-laying undercarriage and in self-propelled road-going or off-road machinery which moves on wheels.

BACKGROUND ART

In the construction of undercarriages intended for different machines, the variation in gauge is achieved by forming the structure of the undercarriage with telescopic cross-beams actuated by suitable hydraulic means. Known solutions fall within two typical arrangements.

A first frequently-used arrangement, provides for the telescoping of the cross-beams, which enables the tracks of the undercarriage to be moved towards or away from each other independently by means of hydraulic cylinders located outside the cross-beams themselves. In this case the telescoping of the cross-beams takes place in a staggered manner on the corresponding sides of the undercarriage, resulting in structural imbalances which, because of the irregular distribution of the masses in question, affects the stability of the entire carriage with unacceptable consequences in certain applications such as lifting machines, for example, track laying cranes.

In this arrangement, the operations of narrowing or widening the gauge are normally carried out manually and, in any case, the travel limit and adjusting devices are operated manually or by interlocked controls without valves and without any guarantee of the locking of the movable parts of the structure in the fully-extended working positions.

A second arrangement, designed specifically for application to so-called mechanically integrated lifting devices provides cylinders for controlling the variable gauge to operate within the telescopic cross-beams connecting the tracks. This arrangement is characterised by the engagement of locking pins for ensuring that there are no geometric variations in the gauge of the undercarriage during working, which is manual both in terms of control and engagement of the stops.

DISCLOSURE OF THE INVENTION

The object of the present invention is to eliminate the disadvantages mentioned above. The invention solves the problem by using apparatus for guiding the telescopic movement which is simple to make, is operated by remote control and is provided with a negative-type of control which operates in the case of damage to or breakdown of the parts of the mechanism. Integrated structural locking apparatus has been provided in which all the components used for varying the gauge of the undercarriage are within the support structure. They are locked so as to prevent any possible relative movement during use of the machine equipped with the undercarriage. Finally they are distributed symmetrically so as not to cause any imbalance in the stability of the machine during operation.

The main advantage of the invention lies essentially in the fact that it avoids the presence of external members for the control and adjustment of the width of the gauge.

Moreover the invention compensates for play between the structural parts which could cause loss of precision or loss of stability of the entire machine and hence reduce safety.

Other significant operating advantages are due to the fact that each control operation can be carried out directly by the operator in the cab without any need for manual operations and hence without the need for any operations from the ground. More particularly, this enables constant adjustment of the geometry of the structural parts even when the machine is moving. This possibility is a very significant operating improvement of the invention.

More particularly, manual intervention may be limited solely to the adjustment of play in the telescopic sliding movement and this corresponds to a further operating advantage since this is exclusively a maintenance operation which typically is intermittent, even though programmed, and does not have operating significance in the command and control sequence relating to the variation of the gauge. Finally it should be stressed that the system of the invention performs its function without affecting the characteristics of mechanical strength of the parts involved in it.

Further characteristics of the invention will become more evident from the content of the claims given below and the advantages thereof will become clearer from the detailed description which follows with reference to the appended drawings, which illustrate a non-limitative embodiment thereof.

BRIEF DESCRIPTION OF THE DRAWINGS

FIG. 1 is a schematic plan view of a preferred embodiment of the equipment;

FIG. 2 is a front perspective view of the invention;

FIG. 7 is a front perspective view of the apparatus illustrated with several parts sectioned to show several details of further possible variants;

FIG. 8 is a section through a detail of FIG. 5 on an enlarged scale;

BEST MODE FOR CARRYING OUT THE INVENTION

Figure 3:
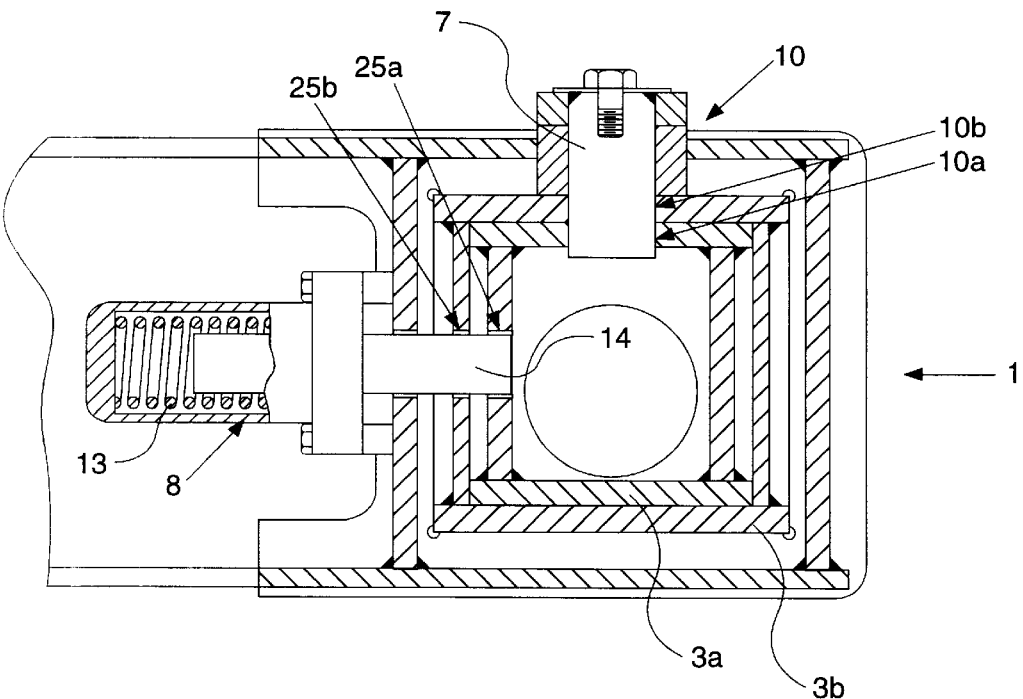
FIG. 3 is a section through the equipment taken on the line III—III of FIG. 1.
Figure 4:
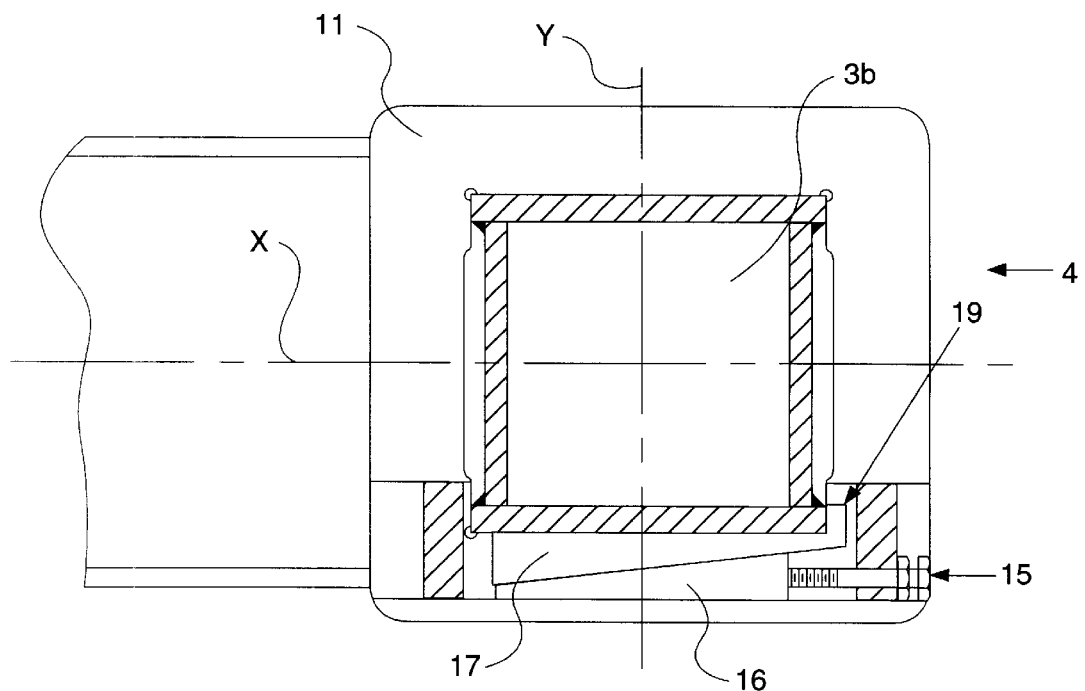
FIG. 4 is a section through the equipment taken on the line VI—VI of FIG. 1.

With reference to FIG. 1, it is seen that the invention essentially concerns equipment for the locking together the movable parts of a structure provided for varying the gauge of variable-gauge track-laying undercarriages 18 or machinery which moves on wheels. The undercarriages 18 are intended, for example, for self-propelled machines for construction sites have connecting structures for the tracks 2, including wheels, including cross-beams 3 carrying a frame 6 movable on support guides 12.

The beams 3 between the tracks 2 are constituted by tubular bearing elements 3a, 3b slidable telescopically within one another so as to be relatively movable in guides 7, 10a, 10b upon operation of telescopic cylinders 5 housed within the beams 3. The telescopic cylinders 5 are rotatably connected at their ends 5a, 5b or 33 to the beam elements 3a, 3b so as to cause their extension from or retraction into each other as is necessary for varying the gauge of the undercarriage 18.

The support guides 12 located to the front and rear of the frame 6 along the direction X of movement of the undercarriage 18 identify the minimum gauge configuration by means of abutments forced against the tracks 2 by annular end plates 11 facing these latter, which plates 11 also contribute to the stability of the entire machine under the action of loads distributed over 360°.

Figure 5:
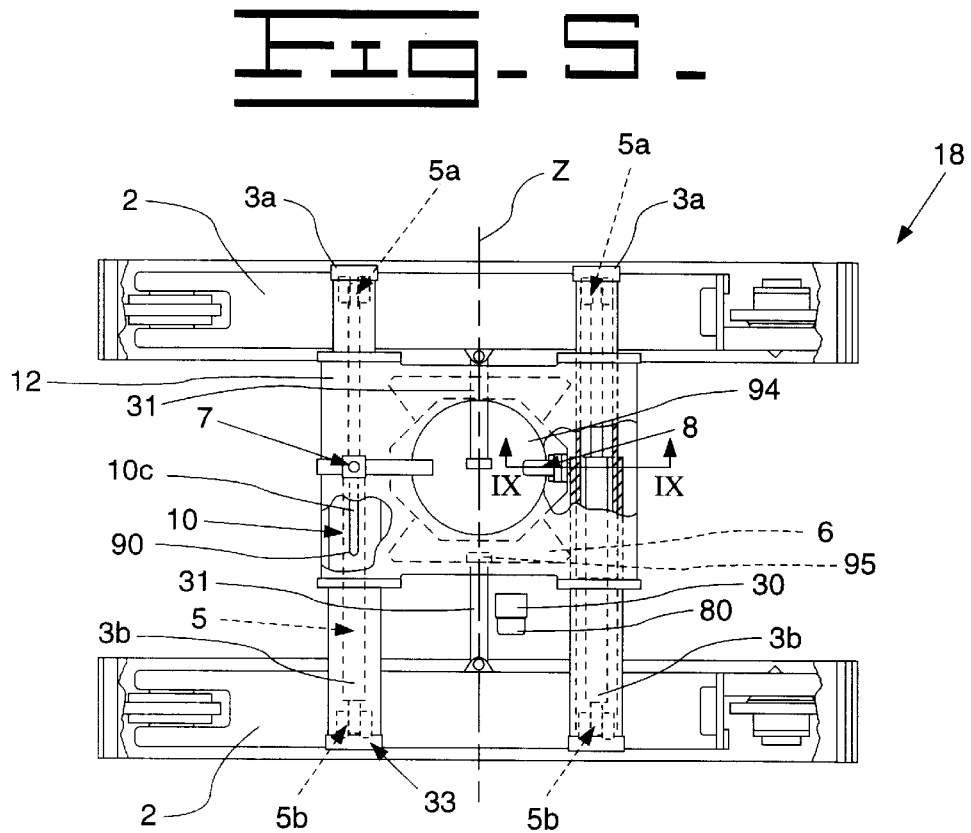
FIGS. 5 and 6 are schematic plan views of several variants of the invention.
Figure 6:
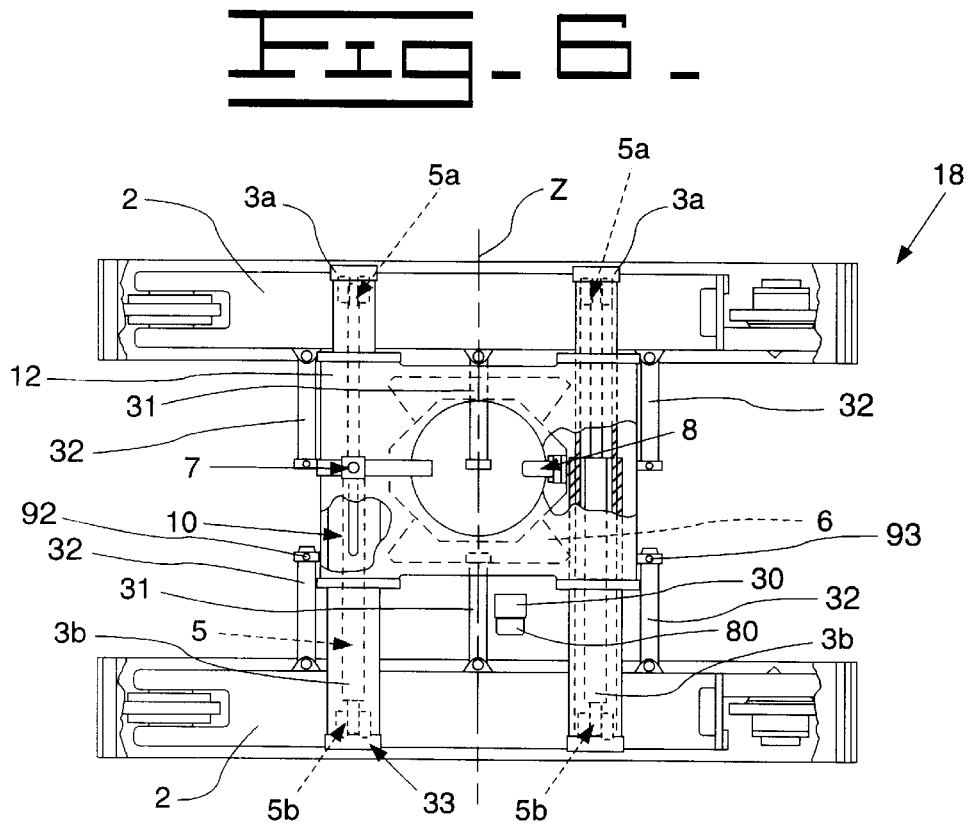

In FIGS. 1, 5 and 6 the undercarriage 18 is shown with one track 2 completely extended and one completely retracted so as better to show the technical characteristics of the apparatus.

The telescopic cylinders 5 are pivoted at their ends 5a, 5b or 33 on the beam elements 3a, 3b and may effect pivoting oscillations of small amplitude in the vertical plane to allow for play.

More particularly, the apparatus includes: a device 1 with remote control 30 for controlling the telescopic cylinders 5, operating so as to cause relative sliding of the beam elements 3a, 3b, limiting the extension of the beam elements 3a, 3b and locking the beam elements 3a, 3b when the desired gauge of the undercarriage is reached. The equipment also includes apparatus 4 for compensating for play operatively located between the support guides 12 for the frame 6 and the cross-beams 3 which can preferably be actuated manually.

The remote control 30 is constituted in this case by a conventional hydraulic pressure control which controls the telescopic cylinders 5.

The apparatus may also have integrated limit stop means 10, 7; 31, 32 for limiting the extension of the beam elements 3a, 3b and locking means 10c, 7a, 7b; 25a, 25b, 14 which interfere mechanically with the beam elements 3a, 3b in the desired gauge configuration.

The limit stop means for limiting the length of the beam elements 3a, 3b (FIGS. 1 and 3) provide for the guide 10 to be constituted by a pair of slots 10a, 10b formed in facing walls of the beam elements 3a, 3b and having lengths equal to the distance between the minimum and maximum gauge. An interference element 7 carried at the middle of the undercarriage 18 is engaged constantly through the slots 10a, 10b. As a result of the extension movement of the beam elements 3a, 3b and by virtue of the relative movement of the beam elements 3a, 3b with respect to the chassis 6, the interference element 7 comes up against one or other of the opposite ends 90 of the slots 10a, 10b, which, operating as travel limits for the movement of the beam elements 3a, 3b enable indication to be given to the remote control 30 of the telescopic cylinders 5 that the minimum or maximum width of the gauge at which the locking of the beam elements 3a, 3b can be activated has been reached.

A preferred solution, illustrated here in FIGS. 1 and 3, also provides for the use of a device 8 for mechanically locking the beam elements 3a, 3b, the operation of which, through a second remote control 80, completes the locking of the cross-beams 3, already effected indirectly by the telescopic cylinders 5.

This supplementary action has the advantage of mechanically ensuring the stability of the geometry of the undercarriage 18 in any operating condition of the machine.

This locking device 8 comprises in particular (FIGS. 1 and 3) an interference element 14 located at the middle of the undercarriage 18 for interacting with holes 25a, 25b formed in the inner sides of the beam elements 3a, 3b. The interference element 14 is movable by means of the second remote control 80 from a first operative position in which it is inserted in the holes 25a, 25b of the beam elements 3a, 3b, preventing relative movement which could cause a change in the gauge, to an extended position in which instead, the beam elements 3a, 3b are free to slide to allow the desired gauge of the undercarriage 18 to be set for various operating conditions.

Preferably the interference element 14 has a single stable position and, for this purpose, a spring 13 is provided which is associated therewith so as to keep it constantly engaged in the holes 25a, 25b in the cross-elements 3a, 3b in the non-actuated state of the locking means.

The embodiment of locking means described above advantageously allows the locking devices 8 to be located between the beam members 3 in a position protected by the undercarriage 18.

Figure 10:
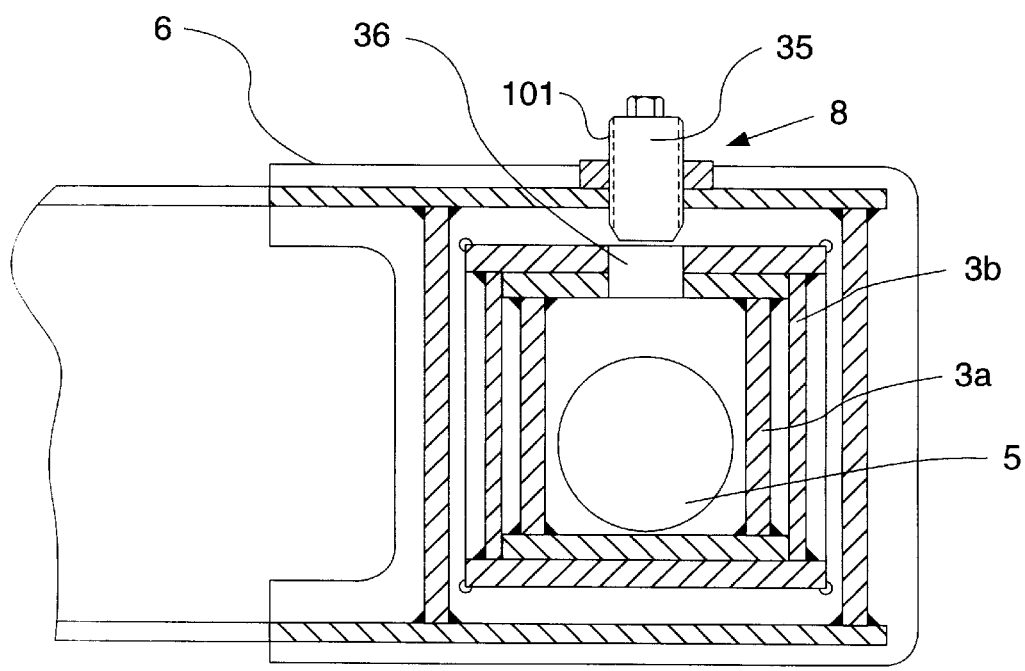
FIG. 10 is a section through the equipment illustrating several variants of the invention shown in FIG. 3.

In a practical embodiment of the locking means, shown in FIG. 10, the locking device 8 also includes an interference element 35 positioned at the middle of the undercarriage 18 but in a different position from the previous one, dictated by the need for easy accessibility from the upper part of the undercarriage 18. In this case the interference element 35 is engaged on the frame 6 by means of threading 101 and interacts with opposing holes 36 formed in the beam elements 3a, 3b. The interference element 35 operates in a similar way to that already explained for the interference element 14 of FIG. 3, but in this case it can be operated manually directly by the operator.

An alternative embodiment of the locking means is shown in FIG. 5. This embodiment is integrated into the means for limiting the telescopic extension whenever the slots 10a, 10b are used.

The slots, 10a, 10b are shaped so as to have a central portion 10c of rectangular shape communicating with circular ends 90 of the slots 10a, 10b of a greater width than the central portion 10c. The interference element 7 shown in FIG. 8 has, in this case, parts 7a, 7b of different widths with respective shapes which are complementary to those of the central portion 10c and the ends 90 of the slots 10a, 10b. The interference element 7 is also rotatable on itself, for example by manual control, from a condition in which it is free to slide along the central portion 10c of the slot 10a, 10b in which it acts as a limit stop to a condition in which it is angularly rotated relative to its previous position, located within the ends 90 of the slots 10a, 10b in which, however, it remains engaged in the ends 90 themselves by dimensional interference with the said central portion 10c.

A further embodiment of the means for limiting the telescopic extension is shown in FIGS. 5 and 6. The means comprise two rigid rods 31 carried by the tracks 2 so as to project horizontally at a position between the beams 3. The rods 31 are in mutual alignment and their opposite free ends 94 carry a transverse element 95 and are located on the undercarriage 18 in a position intermediate between the beams 3. In the minimum gauge condition, the transverse elements 95 bear against each other. In the maximum gauge condition, however, they bear against the frame 6. By operating in this manner, the rods 31 serve as limit stops for the telescopic extension of the beam elements 3a, 3b.

In the variant of the locking means shown in FIG. 6, there are two pairs of rods 32 located outside the undercarriage 18. In this case pins 93 are inserted manually from the outside of the undercarriage 18 into corresponding holes 92 formed in the rods 32.

Figure 9:
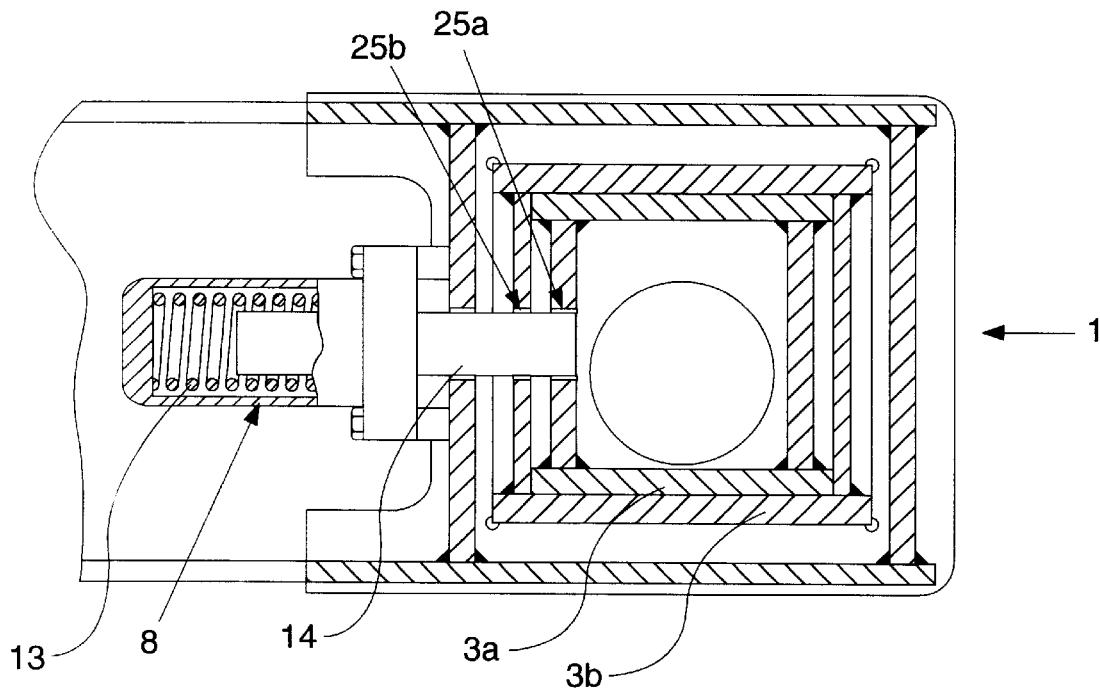
FIG. 9 is a section through the equipment taken on the line IX—IX of FIG. 5.

From FIG. 9 it is seen that, by forming the beam elements 3a, 3b to be complementary to each other so as to constitute the guide 10 for each other for their relative telescopic movement, it is possible to achieve the telescopic extension of the beams 3 without the presence of the slots 10a, 10b of FIG. 3.

It is advantageous to form the beams 3 so that these have opposite open ends 3d. The function of limiting the telescopic extension could be achieved by associating the rods 31 or 32 with the beams 3 formed in this way. Such a combination is particularly useful for meeting the overall size and shape limit imposed during road or rail transport of the undercarriage 18 or of the machine equipped with it. Indeed in this case open-ended beams 3 have the advantage that they allow the disengagement of the telescopic cylinders 5 so that the undercarriage 18 can be dismantled into at least three distinct and separate parts comprising the frame 6 with the beams 3, and the two tracks 2.

The dismantling operation which is also advantageous for the purpose of maintenance of the telescopic cylinders 5, may be further facilitated by forming the ends 33 of the telescopic cylinders 5 which are connected to the beams 3 with an open form as shown in FIG. 7.

The play-compensation apparatus 4 includes jamming means located between the beam elements 3a, 3b so as to press them against each other transverse their direction of telescopic extension Z.

The jamming means are constituted by a pair of wedges 16, 17 located between the beam elements 3a, 3b so as to press them against each other in a first direction X transverse the beams 3.

Moreover, one wedge 17 of the pair has a projection 19 for pressing the beam elements 3a, 3b together in a second direction Y transverse the beams 3.

The wedge 17 has the function described above, receiving the necessary force from the other wedge 16 of the pair which is provided as a thrust element 15 and which can be operated manually from outside the beam 3. The jamming means are located in correspondence with the annular end plates 11, where the beams 3 have a particularly effective strength for resisting the strongly localised forces exerted by the wedges 16 and 17 on the walls of the beams 3.

The operation of the thrust wedge 16 is effected intermittently and manually for the purpose of adjustment. If, however, during operation the need for further play-compensation is perceived, the apparatus 4 could be used as a further device for locking the beams 3, likewise easily automated, for example by the second remote control 80.

Industrial Applicability

The operations for locking the parts of the apparatus together occur in this sequence:

the locking means are disengaged with the result that they no longer prevent the relative movement of the beam elements 3a, 3b;

the remote control 30 governs the movement of the telescopic cylinders 5 to cause the resultant movement of the beam elements 3a, 3b;

the beam elements 3a, 3b are guided determining the useful gauge widening or narrowing travel;

once the telescopic movement is finished, the locking means are again inserted in their engagement positions in the beam elements 3a, 3b;

if necessary, the play adjustment apparatus 4 is activated so as further to lock the beam elements 3a, 3b together upon possible corresponding activation of the second remote control 80.

Numerous modifications and variants may be made to the invention thus conceived, all of which fall within the scope of the inventive concept. Moreover all the details may be replaced by technically equivalent elements.

In practice it is obviously possible to make modifications and/or improvements while nevertheless falling within the scope of the following claims.

What is claimed is:

1. Apparatus for locking together structure for varying the gauge of a variable gauge undercarriage (18), comprising:

tracks (2) connected by intermediate beams (3) supported by a frame (6) mounted on support guides (12), provided with annular plates (11) facing the tracks (2), the beams (3) comprising beam elements (3a,3b) mounted telescopically within one another so as to be guided for relative movement (7, 10);

telescopic cylinders (5) within the beams (3) and connected to the beam elements (3a, 3b) so as to cause relative telescopic movement thereof towards and away from each other;

a device (1) for remote control (30) of the telescopic cylinders (5) for actuating the relative sliding of the beam elements (3a, 3b);

play-compensation apparatus (4) operatively located between the support guides (12) of the frame (6) and the beams (3);

a limit means (10; 31; 32) for limiting the telescopic extension of the beam elements (3a, 3b);

a pair of slots (10a, 10b) formed in facing walls of the beam elements (3a, 3b); and an interference element (7) engaged in the slots (10a, 10b) and carried by the undercarriage (18) in the middle of the latter, wherein:

the limit means limits the length to which the beam elements (3a, 3b) move apart, the interference element locks the beam elements (3a, 3b) upon achievement of the desired gauge of the undercarriage (18), and the interference element (7) reacts against opposite ends (90) of the slots (10a, 10b) at the minimum and maximum gauge.

2. Apparatus for locking together structure for varying the gauge of a variable gauge undercarriage (18), comprising:

tracks (2) connected by intermediate beams (3) supported by a frame (6) mounted on support guides (12), provided with annular plates (11) facing the tracks (2), the beams (3) comprising beam elements (3a,3b) mounted telescopically within one another so as to be guided for relative movement (7, 10);

telescopic cylinders (5) within the beams (3) and connected to the beam elements (3a, 3b) so as to cause relative telescopic movement thereof towards and away from each other;

a device (1) for remote control (30) of the telescopic cylinders (5) for actuating the relative sliding of the beam elements (3a, 3b);

play-compensation apparatus (4) operatively located between the support guides (12) of the frame (6) and the beams (3);

a limit means (10; 31; 32) for limiting the telescopic extension of the beam elements (3a, 3b); and a jamming means (16,17) located between the beam elements (3a,3b) to press them against each other transversely of their direction of telescopic movement (Z), wherein:

the limit means limits the length to which the beam elements (3a, 3b) move apart, the interference element locks the beam elements (3a, 3b) upon achievement of the desired gauge of the undercarriage (18), the jamming means comprise a pair of wedges (16,17) located between the beam elements (3*a*,3*b*) so as to press them against each other in a first transverse direction (X) transverse the beam (3), and one wedge (17) of the pair has a projection (19) adapted to press the beam elements (3*a*, 3*b*) together in a second direction (Y) transverse the beam (3).

3. Apparatus according to claim 2, characterised in that one wedge (16) of the pair has a thrust element (15) which can be actuated from outside the beam (3).

4. Apparatus according to claim 3, characterised in that the thrust element (15) is manually operable.

* * * * *